United States Patent
Pynnönen

(10) Patent No.: US 12,194,654 B2
(45) Date of Patent: Jan. 14, 2025

(54) LAMINATED VENEER LUMBER PRODUCT AND METHOD FOR MANUFACTURING THEREOF

(71) Applicant: Stora Enso OYJ, Helsinki (FI)

(72) Inventor: Janne Pynnönen, Lempäälä (FI)

(73) Assignee: Stora Enso OYJ, Helsinki (FI)

( * ) Notice: Subject to any disclaimer, the term of this patent is extended or adjusted under 35 U.S.C. 154(b) by 594 days.

(21) Appl. No.: 17/594,850

(22) PCT Filed: Apr. 27, 2020

(86) PCT No.: PCT/IB2020/053920
§ 371 (c)(1),
(2) Date: Nov. 1, 2021

(87) PCT Pub. No.: WO2020/222102
PCT Pub. Date: Nov. 5, 2020

(65) Prior Publication Data
US 2022/0212361 A1  Jul. 7, 2022

(30) Foreign Application Priority Data
May 2, 2019  (SE) .................................. 1950524-7

(51) Int. Cl.
| | |
|---|---|
| *B32B 21/14* | (2006.01) |
| *B27D 1/02* | (2006.01) |
| *B27D 1/04* | (2006.01) |
| *B32B 21/13* | (2006.01) |
| *C09D 101/02* | (2006.01) |

(52) U.S. Cl.
CPC ............... *B27D 1/04* (2013.01); *B27D 1/02* (2013.01); *C09D 101/02* (2013.01)

(58) Field of Classification Search
None
See application file for complete search history.

(56) References Cited

U.S. PATENT DOCUMENTS

| | | | |
|---|---|---|---|
| 10,538,065 | B2 | 1/2020 | Pynnönen et al. |
| 11,077,648 | B2 | 8/2021 | Heiskanen et al. |
| 11,155,698 | B2 | 10/2021 | Heiskanen et al. |
| 11,339,313 | B2 | 5/2022 | Horito et al. |
| 2007/0048542 | A1 | 3/2007 | Ou |
| 2013/0017400 | A1 | 1/2013 | Imai et al. |
| 2016/0002462 | A1 | 1/2016 | Zhang et al. |
| 2016/0115359 | A1 | 4/2016 | Wang et al. |
| 2016/0145478 | A1 | 5/2016 | Blount |
| 2017/0239836 | A1 | 8/2017 | Zhan et al. |
| 2018/0141319 | A1 | 5/2018 | Ankerfors et al. |
| 2021/0039134 | A1* | 2/2021 | Pere .................. B05D 7/10 |

FOREIGN PATENT DOCUMENTS

| | | | |
|---|---|---|---|
| AU | 2018257311 A1 | 11/2019 | |
| CN | 201415427 Y | 3/2010 | |
| CN | 102821949 A | 12/2012 | |
| CN | 105164206 A | 12/2015 | |
| CN | 106013715 A | 10/2016 | |
| CN | 107531024 A | 1/2018 | |
| CN | 107849823 A | 3/2018 | |
| CN | 108884642 A | 11/2018 | |
| CN | 109415519 A | 3/2019 | |
| GB | 1023714 | 3/1966 | |
| SE | 1651071 A1 | 2/2018 | |
| WO | WO-9513920 A1 * | 5/1995 | ............... B27D 1/04 |
| WO | 2013036744 A1 | 3/2013 | |
| WO | 2018199190 A1 | 11/2018 | |
| WO | 2019145600 A1 | 8/2019 | |
| WO | 2019239299 A1 | 12/2019 | |

OTHER PUBLICATIONS

Fengel. D., Ultrastructural behaviour of cell wall polysaccharides, TAPPI, 1970, vol. 53, No. 3, pp. 497-503. (abstract only).
Chinga-Carrasco, Gary, Cellulose fibres, nanofibrils and microfibrils: The morphological sequence of MFC components from a plant physiology and fibre technology point of view, Nanoscale Research Letters, 2011, 6:417, http://www.nanoscalereslett.com/content/6/1/417.
International search report from corresponding PCT application No. PCT/IB2020/053920, mailed on May 13, 2020.
Nadir Ayrilmis et al., Microfibrillated-cellulose-modified urea-formaldehyde adhesives with different F/U molar ratios for wood-based composites, Journal of Adhesion Science and Technology, 30:18, 2032-2043, DOI:10.1080/01694243.2016.1175246, (2016).
Extended European Search report from corresponding European application No. EP 2079888.6, dated Feb. 21, 2023.

* cited by examiner

*Primary Examiner* — Michael J Feely
(74) *Attorney, Agent, or Firm* — Greer, Burns & Crain, Ltd.

(57) ABSTRACT

The present invention relates to a process for preparing laminated veneer lumber treated with microfibrillated cellulose. The invention also relates to a modified laminated veneer lumber product produced using said process.

4 Claims, No Drawings

LAMINATED VENEER LUMBER PRODUCT AND METHOD FOR MANUFACTURING THEREOF

This application is a U.S. National Phase under 35 U.S.C. § 371 of International Application No. PCT/IB2020/053920, filed Apr. 27, 2020, which claims priority under 35 U.S.C. §§ 119 and 365 to Swedish Application No. 1950524-7, filed May 2, 2019.

FIELD OF THE INVENTION

The present invention relates to a process for preparing laminated veneer lumber treated with microfibrillated cellulose. The invention also relates to a modified laminated veneer lumber product produced using said process.

BACKGROUND

Traditionally, solid sawn timber is used for wood applications in the outdoors. Tropical hardwood, such as teak (*Tectona grandis*), is often used in outdoor applications.

Due to the decreasing availability of stress grading high quality structural timber, there is an increasing demand for laminated veneer lumber (LVL) to replace the use of solid wood, particularly in the construction industry.

Laminated veneer lumber (LVL) is a pile of layers or plies of wood veneer bonded one veneer layer to the next by an adhesive. Laminated veneer lumber (LVL) has been developed for structural applications.

LVL for structural applications is generally made from softwood.

LVL made from softwoods is well documented in the art. For example, a spruce LVL has been produced in Finland since 1981 and is known under the name Kerto™. LVL is generally made from softwoods, such as spruce, pine or Douglas fir.

One of the methods to improve the stability and durability of LVL is impregnation. This involves the introduction of chemical substances into the wood in order to improve its characteristics and impart new properties. Impregnation may stabilize dimensions, increase strength, increase resistance to water and moisture, and reduce cracking.

One important aspect of LVL is its strength properties. This is of particular relevance when the LVL is used in construction elements.

There is thus a need for improved laminated veneer lumber products. There is also a need for improved processes for preparing such products.

SUMMARY OF THE INVENTION

It has surprisingly been found that the strength properties of LVL can be improved by treating never dried veneers with microfibrillated cellulose.

It is an object of the present invention to provide a laminated veneer lumber product having improved properties, in particular improved strength properties, while still being produced from renewable materials.

Therefore, one aspect of the present invention is a process for preparing laminated veneer lumber comprising the steps of a) providing layers of never dried veneer;
b) applying a dispersion comprising microfibrillated cellulose on at least one side of each veneer;
c) drying the veneers from step b);
d) applying adhesive on at least one side of the veneers from step c); and
e) forming laminated veneer lumber by pressing the layers of veneer from step d) together during heating at a temperature of from 110° C. to 130° C.

In one embodiment of the present invention, the amount of microfibrillated cellulose applied in step b) is preferably in the range of from 1 gram per square meter to 100 grams per square meter, more preferably from 1 gram per square meter to 20 grams per square meter, calculated as the dry content of the dispersion applied. The dispersion is an aqueous dispersion and the solid content of microfibrillated cellulose in the dispersion is typically from 0.1 wt-% to 10 wt-%.

In one embodiment of the present invention, the dispersion comprising microfibrillated cellulose is in step b) applied to both sides of each individual never dried veneer. In one embodiment of the present invention, the dispersion comprising microfibrillated cellulose is in step b) applied to both sides of each individual never dried veneer simultaneously. In one embodiment, the dispersion comprising microfibrillated cellulose is in step b) applied to both sides of each individual veneer using spraying. In another embodiment, the dispersion comprising microfibrillated cellulose is in step b) applied to both sides of each individual veneer by dipping each veneer in the dispersion. In another embodiment, the dispersion comprising microfibrillated cellulose is in step b) applied to both sides of each individual veneer by applying the dispersion using brushes or rollers. When the dispersion of microfibrillated cellulose is applied by dipping or by the use of brushes or rollers, the solid content of the dispersion can be higher than when the dispersion comprising microfibrillated cellulose is applied by spraying. A benefit of using a higher solid content is that the duration of the subsequent drying step can be shortened and less energy is required.

One embodiment of the present invention is a laminated veneer lumber product obtainable by the process according to the present invention. The laminated veneer lumber product thus comprises layers of veneer, wherein microfibrillated cellulose and adhesive is provided between the layers of veneer.

DETAILED DESCRIPTION

The microfibrillated cellulose used in the dispersion in step b) can be prepared using methods known in the art.

When applied by spraying, the dispersion comprising microfibrillated cellulose usually has a solid content of from 0.1 wt-% to 2 wt-%. To facilitate pumping of the dispersion to the spray nozzles, the dispersion may be subjected to shearing, such as in a high shear apparatus, such as a batch high shear mixer, an in-line high shear mixer or ultra-high shear inline high shear mixer. Suitable equipment also includes rotor/stator mixers commonly used for dispersing microfibrillated cellulose.

To facilitate pumping of the dispersion to the spray nozzles, the dispersion may be heated prior to or during the pumping to the spray nozzles. By heating the dispersion to a temperature of from 50° C. to 90° C., the viscosity of the dispersion comprising microfibrillated cellulose may be reduced, thereby facilitating the pumping. By using a heated dispersion, the microfibrillated cellulose may also, to a larger extent, penetrate into each veneer and the duration of the subsequent drying can be shortened.

In one embodiment, the microfibrillated cellulose is produced by fibrillating cellulose, such as pulp, in the presence of inorganic particulate material, such as inorganic pigments. This is particularly useful if a pigmented surface of the LVL is desirable. By such co-processing, the fibrillation is facilitated and consumes less energy. In one embodiment, the pigment used, or at least a part of the pigment used, is a hyper-platy pigment, i.e. a flake-shaped pigment. When applying the mixture of the microfibrillated cellulose and the hyper-platy pigment to the surface of the never dried veneer, a surface structure is formed which, because of the flake-shaped pigments, makes the veneer less sensitive to moisture.

The drying of the veneers in step c) is carried out using drying methods commonly used for drying veneers.

The adhesive used in step d) is any adhesive suitable for the production of LVL. For example, the adhesive may be a phenol-formaldehyde adhesive having an average molecular weight of at least 300 g/mol, such as 500 g/mol, 1000 g/mol or higher. In one embodiment, the adhesive used in step d) is applied only on one side of each veneer. Preferably, 120 to 200 gram adhesive per square meter veneer is applied.

According to the present invention, the curing is performed while pressing the layers of veneer together during heating at a temperature of from 110° C. to 130° C.

In one embodiment of the present invention, the dispersion comprising microfibrillated cellulose is in step b) applied to both sides of each individual never dried veneer simultaneously. In one embodiment, the dispersion comprising microfibrillated cellulose is in step b) applied to both sides of each individual never dried veneer using spraying, brushing or similar. Applying the dispersion comprising microfibrillated cellulose to both sides of the never dried veneer simultaneously is advantageous in a production setting and increases production efficiency. The applying of the dispersion comprising microfibrillated cellulose using spraying can be performed using equipment and methodologies known in the art.

The microfibrillated cellulose may have a Schopper Riegler value)(SR°) of more than 60 SR°, or more than 65 SR°, or more than 80 SR°. The Schopper-Riegler value can be determined through the standard method defined in EN ISO 5267-1. The microfibrillated cellulose has a surface area of at least 30 $m^2/g$ or more preferably more than 60 $m^2/g$ or most pref.>90 $m^2/g$ when determined according to nitrogen adsorption (BET) method for a solvent exchanged and freeze dried sample.

The dispersion comprising microfibrillated cellulose may comprise other components than microfibrillated cellulose, such as natural fiber material of larger dimensions, such as pulp. However, the microfibrillated cellulose content of the suspension is in the range of from 50 to 99.9 weight-% based on the weight of solids of the suspension. In one embodiment, the microfibrillated cellulose content of the suspension may be in the range of 70 to 99 weight-%, in the range of 70 to 95 weight-%, or in the range of from 75 to 90 weight-%.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J., March* 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the microfibrillated cellulose has a surface area of at least 30 $m^2/g$ or more preferably more than 60 $m^2/g$ or most pref.>90 $m^2/g$ when determined according to nitrogen adsorption (BET) method for a solvent exchanged and freeze dried sample.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions.

According to another embodiment, the suspension may comprise a mixture of different types of fibers, such as microfibrillated cellulose, and an amount of other types of fiber, such as kraft fibers, fines, reinforcement fibers, synthetic fibers, dissolving pulp, TMP or CTMP, PGW, etc.

In view of the above detailed description of the present invention, other modifications and variations will become apparent to those skilled in the art. However, it should be apparent that such other modifications and variations may be effected without departing from the spirit and scope of the invention.

The invention claimed is:

1. A process for preparing a laminated veneer lumber product comprising the steps of
   a) providing layers of never dried veneer;
   b) applying a dispersion comprising microfibrillated cellulose, on at least one side of each layer of never dried veneer, wherein the dispersion comprising microfibrillated cellulose has a solid content of from 0.1 wt-% to 2 wt-%;
   c) drying the layers of never dried veneer after step b);
   d) applying adhesive on at least one side of the layers of never dried veneer after step c); and
   e) forming a laminated veneer lumber by pressing the layers of never dried veneer obtained after step d) together during heating at a temperature of from 110° C. to 130° C.

2. The process according to claim 1, wherein an amount of microfibrillated cellulose applied in step b) is in a range of from 1 gram per square meter to 20 grams per square meter.

3. The process according to claim 1, wherein the dispersion comprising microfibrillated cellulose in step b) is applied to both sides of each layer of never dried veneer simultaneously.

4. The process according to claim 3, wherein the dispersion comprising microfibrillated cellulose used in step b) is applied using spraying.

* * * * *